United States Patent
Kim et al.

(10) Patent No.: US 10,074,871 B2
(45) Date of Patent: Sep. 11, 2018

(54) METHOD OF PRODUCING LITHIUM ION CONDUCTIVE SULFIDES COMPRISING SIMPLE SUBSTANCES

(71) Applicant: KOREA INSTITUTE OF SCIENCE AND TECHNOLOGY, Seoul (KR)

(72) Inventors: Hyoung Chul Kim, Seoul (KR); Hun Gi Jung, Seoul (KR); Jong Ho Lee, Seoul (KR); Hae Weon Lee, Seoul (KR); Byung Kook Kim, Seoul (KR); Ji Won Son, Seoul (KR); Wo Dum Jung, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 42 days.

(21) Appl. No.: 15/288,494

(22) Filed: Oct. 7, 2016

(65) Prior Publication Data

US 2017/0317381 A1    Nov. 2, 2017

(30) Foreign Application Priority Data

Apr. 27, 2016 (KR) .................. 10-2016-0051212

(51) Int. Cl.
| | | |
|---|---|---|
| *H01M 10/0562* | (2010.01) | |
| *H01M 10/0525* | (2010.01) | |
| *C01B 17/22* | (2006.01) | |
| *H01B 1/10* | (2006.01) | |

(52) U.S. Cl.
CPC ......... *H01M 10/0562* (2013.01); *C01B 17/22* (2013.01); *H01B 1/10* (2013.01); *H01M 10/0525* (2013.01); *H01M 2300/0068* (2013.01)

(58) Field of Classification Search
CPC ......... H01M 10/0525; H01M 10/0562; H01M 2300/0068
See application file for complete search history.

(56) References Cited

U.S. PATENT DOCUMENTS

| | | | | |
|---|---|---|---|---|
| 2013/0288134 | A1* | 10/2013 | Hama ................. | C03C 3/321 429/322 |
| 2014/0162139 | A1* | 6/2014 | Hoshiba ............. | H01M 4/622 429/322 |
| 2016/0104917 | A1* | 4/2016 | Sato .................... | C01B 17/22 429/189 |

FOREIGN PATENT DOCUMENTS

| | | |
|---|---|---|
| KR | 10-2012-0028856 A | 3/2012 |
| KR | 10-1367787 B1 | 2/2014 |
| KR | 10-2016-0005775 A | 1/2016 |
| WO | WO 2014/102580 * | 7/2014 |
| WO | WO 2014/192309 * | 12/2014 |

* cited by examiner

*Primary Examiner* — Anca Eoff
(74) *Attorney, Agent, or Firm* — Goldilocks Zone IP Law

(57) ABSTRACT

A method for preparing a lithium ion conductive sulfide, which is capable of independently controlling the elemental ratio of lithium (Li), phosphorus (P), sulfur (S), etc, is provided. The method for preparing a lithium ion conductive sulfide can provide a lithium ion conductive sulfide having a crystal structure and an anion cluster distribution distinguished from those of existing ones.

7 Claims, 3 Drawing Sheets

METHOD OF PRODUCING LITHIUM ION CONDUCTIVE SULFIDES COMPRISING SIMPLE SUBSTANCES

CROSS-REFERENCE TO RELATED APPLICATIONS

This application claims, under 35 U.S.C. § 119, the priority of Korean Patent Application No. 10-2016-0051212, filed on Apr. 27, 2016, in the Korean Intellectual Property Office, the disclosure of which is incorporated herein by reference in its entirety.

BACKGROUND

(a) Technical Field

The present invention relates to a method for preparing a lithium ion conductive sulfide, which is capable of freely controlling the elemental ratio of lithium (Li), phosphorus (P), sulfur (S), etc. The present invention can provide a lithium ion conductive sulfide having a crystal structure and an anion cluster distribution distinguished from those of existing ones.

(b) Background Art

At present, secondary batteries are widely used in from large devices such as automobiles, power storage systems, etc. to small devices such as mobile phones, camcorders, laptops, etc.

As the secondary batteries are used in wide areas, there are increasing needs for the improvement in safety and performance of the batteries.

As one of the secondary batteries, the lithium secondary battery is advantageous over the nickel-manganese battery or the nickel-cadmium battery in that it exhibits high energy density and high capacity per unit area.

However, because the electrolytes used in the existing lithium secondary battery are mostly liquid electrolytes such as organic solvents, there have been safety problems such as the leakage of the electrolytes and the risk of fire resulting therefrom. For this reason, all-solid-state batteries using inorganic solid electrolytes, not organic liquid electrolytes, are drawing attention recently.

The solid electrolyte is safer than the liquid electrolyte because it is nonflammable or flame-retardant.

The solid electrolytes are classified into oxide-based ones and sulfide-based ones. The sulfide-based solid electrolytes are mainly used because they exhibit high lithium ion conductivity and are stable over wide voltage ranges as compared to the oxide-based solid electrolytes.

However, the sulfide-based solid electrolytes still have problems when compared with the liquid electrolytes, such as low lithium ion conductivity, instability of crystal phase, poor atmospheric stability, limited processability and a ratio of high conductivity composition in a narrow area.

Korean Patent Publication No. 10-2016-0005775 (hereinafter, 'patent document 1') and Korean Patent Registration No. 10-1367787 (hereinafter, 'patent document 2') have attempted to solve these problems.

The patent document 1 teaches that a sulfide solid electrolyte material with high lithium ion conductivity can be prepared by adding LiI and LiBr to $Li_2S$ and $P_2S_5$ with specific ratios. The patent document 2 teaches that a safe sulfide solid electrolyte material which produces very little hydrogen sulfide when contacting water can be obtained by mixing $Li_2S$ and $P_2S_5$ at a ratio of 75:25.

However, these prior arts are insufficient to solve the above-described problems of the sulfide-based solid electrolytes.

The prior arts are mostly based on the mixing of lithium sulfide ($Li_2S$) and phosphorus pentasulfide ($P_2S_5$) at a specific ratio or the addition of a small amount of a compound such as lithium iodide (LiI) thereto when forming a matrix which is the most important factor in ion conductivity. Therefore, there has been limitation in obtaining novel lithium ion conductive sulfide-based solid electrolytes having various ratios of elements and distinguished structures.

REFERENCES OF THE RELATED ART

Patent Documents (Patent document 1) Korean Patent Publication No. 10-2016-0005775.

(Patent document 2) Korean Patent Registration No. 10-1367787.

SUMMARY

The present invention is designed to prove the problems of the prior arts.

The present invention is directed to providing a preparation method which is capable of freely controlling the composition ratio of elements contained in a lithium ion conductive sulfide.

The object of the present invention is not limited to that described above. The object the present invention will become more fully apparent from the following description and may be realized by the means shown in the appended claims and combinations thereof.

In an aspect, the present invention provides a method for preparing a lithium ion conductive sulfide containing lithium (Li), phosphorus (P) and sulfur (S), which includes: (1) a step of preparing a mixture containing lithium sulfide ($Li_2S$) and phosphorus pentasulfide ($P_2S_5$); (2) a step of vitrifying the mixture by pulverizing the mixture; and (3) a step of crystallizing the vitrified mixture by heat-treating the vitrified mixture, wherein the composition ratio of lithium, phosphorus and sulfur in the lithium ion conductive sulfide is controlled independently by performing the vitrification and the crystallization after mixing one or more of elemental phosphorus and elemental sulfur to the mixture in the step (1).

In a specific exemplary embodiment of the present invention, the step (3) may be performed at 200-1200° C. for 0.1-100 hours.

In a specific exemplary embodiment of the present invention, in the step (1), the molar ratio of the lithium sulfide, the phosphorus pentasulfide, the elemental phosphorus and the elemental sulfur may be 9:2:2:3.

In a specific exemplary embodiment of the present invention, the lithium ion conductive sulfide may exhibit a first peak at 390±5 $cm^{-1}$ and a second peak at 425±5 $cm^{-1}$ in a Raman spectrum and the intensity of the second peak may be larger than the intensity of the first peak.

In a specific exemplary embodiment of the present invention, the lithium ion conductive sulfide may have an anion cluster distribution of $P_2S_6^{2-}$ and $PS_4^{3-}$.

In a specific exemplary embodiment of the present invention, in the step (1), the molar ratio of the lithium sulfide, the phosphorus pentasulfide, the elemental phosphorus and the elemental sulfur may be 15:5:2:4.

In a specific exemplary embodiment of the present invention, the lithium ion conductive sulfide may exhibit peaks at $390 \pm 5$ cm$^{-1}$, $410 \pm 5$ cm$^{-1}$ and $425 \pm 5$ cm$^{-1}$ in a Raman spectrum.

In a specific exemplary embodiment of the present invention, the lithium ion conductive sulfide may have an anion cluster distribution of $P_2S_6^{2-}$, $P_2S_7^{4-}$ and $PS_4^{3-}$.

The present invention provides the following effects.

According to the method for preparing a lithium ion conductive sulfide of the present invention, the composition ratio of the elements contained in the lithium ion conductive sulfide can be controlled freely.

Also, according to the present invention, the lithium ion conductive sulfide may have a crystal structure and an anion cluster distribution distinguished from those of the existing one by controlling the composition ratio of the elements contained in the lithium ion conductive sulfide.

Also, according to the present invention, various lithium ion conductive sulfides having different composition ratios of lithium, phosphorus and sulfur elements can be obtained, and a source may be provided for further study and development accordingly.

The effects of the present invention are not limited to those described above. It is to be understood that the effects of the present invention include all the effects that can be inferred from the following description.

DETAILED DESCRIPTION

Figure 1:
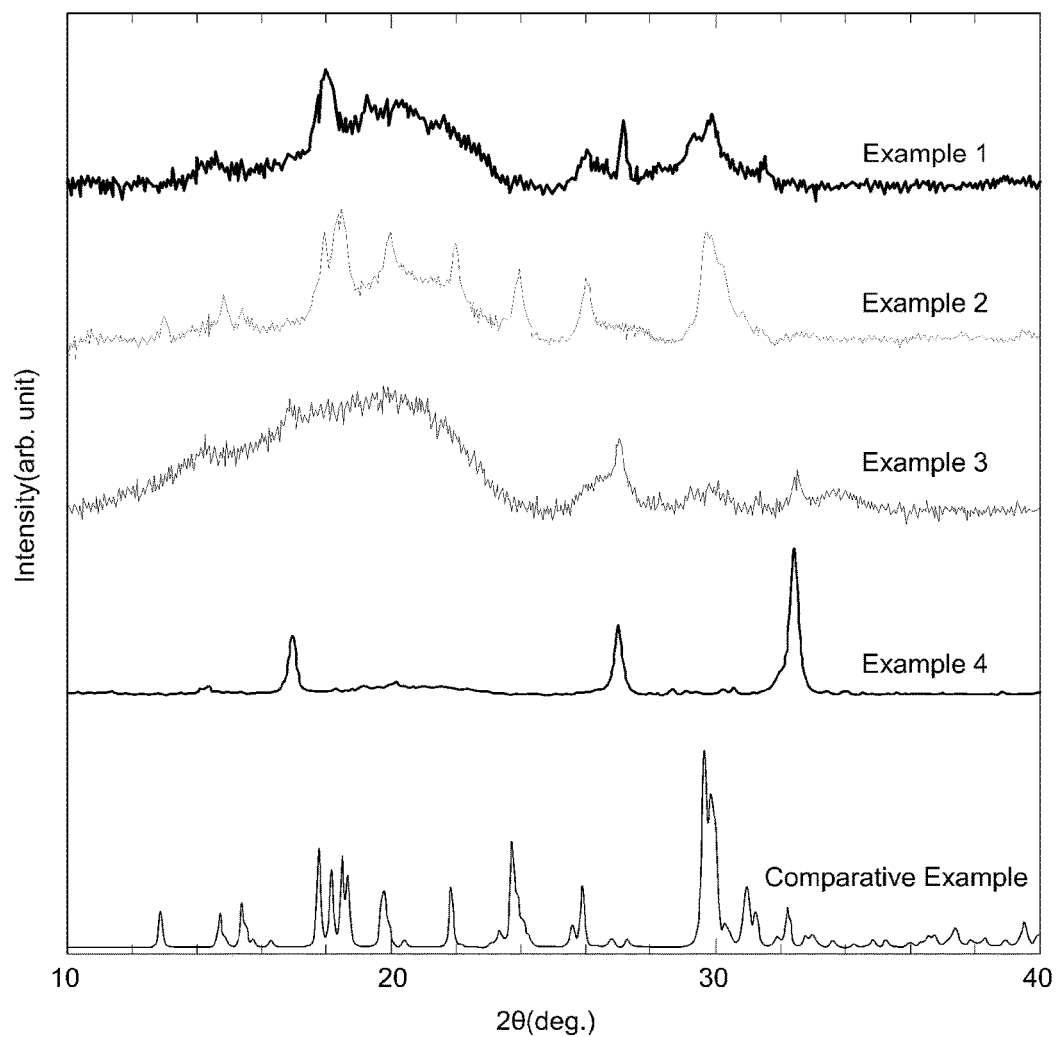
FIG. 1 shows X-ray diffraction analysis results for Examples 1-4 and Comparative Example in Test Example 1.

Hereinafter, the present invention is described in detail through exemplary embodiments. The exemplary embodiments of the present invention may be changed in various forms as long as they do not change the subject matter of the present invention. It is to be understood that the scope of the present invention is not limited by the exemplary embodiments.

Description about known functions and structures will be omitted if they make the subject matter of the present invention unclear. It is to be understood that the terms "comprise", "contain" or "include" when used in this specification do not preclude the presence of other elements or components.

A lithium ion conductive sulfide according to the present invention is a lithium (Li)-phosphorus (P)-sulfur (S) sulfide-based material used as a solid electrolyte used in an all-solid-state secondary battery.

Conventionally, a lithium ion conductive sulfide has been prepared through mechanical alloying, heat treatment, etc. of sulfur compounds such as lithium sulfide ($Li_2S$) and phosphorus pentasulfide ($P_2S_5$) as source materials.

As described above, there have been attempts to add such compounds as LiI, LiBr, etc. to the sulfur compounds or control the mixing molar ratio of the sulfur compounds. However, it was not possible to prepare lithium ion conductive sulfides having various ratios of elements.

Specifically, it was difficult to freely control the elemental ratio of the lithium ion conductive sulfide because only multicomponent compounds such as lithium sulfide ($Li_2S$), phosphorus pentasulfide ($P_2S_5$), germanium sulfide ($GeS_2$), LiI, LiBr, etc. were used as source materials.

As such, research on the lithium ion conductive sulfide has only focused on the optimization of the relative mixing ratio of lithium sulfide ($Li_2S$) to phosphorus pentasulfide ($P_2S_5$). Although the mixing ratios providing relatively high ion conductivity such as 70:30, 75:25, 80:20, etc. have been found out as a result, it became an obstacle to the development of various lithium ion conductive sulfides.

The present invention has been made to overcome the limitation of the prior arts and is directed to providing a method for preparing a lithium ion conductive sulfide with the following features.

The method for preparing a lithium ion conductive sulfide according to the present invention includes: (1) a step of preparing a mixture containing lithium sulfide ($Li_2S$) and phosphorus pentasulfide ($P_2S_5$); (2) a step of vitrifying the mixture by pulverizing the same; and (3) a step of crystallizing the vitrified mixture by heat-treating the same, wherein the composition ratio of lithium (Li), phosphorus (P) and sulfur (S) in the lithium ion conductive sulfide is controlled independently by performing the vitrification and the crystallization after mixing one or more of elemental phosphorus and elemental sulfur to the mixture in the step (1).

Hereinafter, each step is described in detail.

In the step (1), the source materials of the lithium ion conductive sulfide are mixed.

The source materials may include a sulfur compound, elemental phosphorus and elemental sulfur.

In this specification, 'elemental phosphorus' is phosphorus as a simple substance, and 'elemental sulfur' is sulfur as a simple substance.

Specifically, lithium sulfide ($Li_2S$) and phosphorus pentasulfide ($P_2S_5$) may be used as the sulfur compound. However, any sulfur compound commonly used in the preparation of a lithium ion conductive sulfide may be used without being limited thereto.

The sulfur compound may also be a sulfur compound or a sulfur oxide containing a substitutional element. The substitutional element may be boron (B), carbon (C), nitrogen (N), aluminum (Al), silicon (Si), vanadium (V), manganese (Mn), iron (Fe), cobalt (Co), copper (Cu), zinc (Zn), gallium (Ga), germanium (Ge), arsenic (As), selenium (Se), silver (Ag), cadmium (Cd), phosphorus (P), tin (Sn), antimony (Sb), tellurium (Te), lead (Pb), bismuth (Bi), etc.

According to the present invention, the composition ratio of lithium, phosphorus and sulfur in the lithium ion conductive sulfide can be controlled independently by performing the vitrification and the crystallization after mixing one or more of elemental phosphorus and elemental sulfur to the multicomponent sulfur compound.

In this specification, 'independent mixing' means mixing of the elemental phosphorus and the elemental sulfur independently of the relative mixing ratio of the multicomponent sulfur compound, and 'independent control' means individual free control of the composition ratio of lithium, phosphorus and sulfur elements in the lithium ion conductive sulfide-based solid electrolyte through independent mixing. The change in the composition ratio of lithium, phosphorus and sulfur elements may affect the anion cluster distribution of the lithium ion conductive sulfide. In this specification, the 'anion cluster' refers to an aggregate of phosphorus and sulfur atoms formed when the source materials are rearranged to a specific crystal structure through vitrification and crystallization.

Different anion clusters have different crystal structures. For example, $PS_4^3$ has a tetrahedral crystal structure and $P_2S_5^{2-}$ has a sheet crystal structure. Accordingly, if the anion cluster distribution changes due to the change in the composition ratio of the elements, the crystal structure of the lithium ion conductive sulfide changes too.

This means that a lithium ion conductive sulfide having a new crystal structure which is different from that of the existing one can be obtained according to the present invention.

In the step (2), the mixture is vitrified by pulverizing the same. It may be performed by using a ball mill such as a tumbling ball mill, a vibratory ball mill, a planetary ball mill, etc., a vibration mixer mill, a SPEX mill, etc. Specifically, a ball mill may be used because additional pulverizing effect may be achieved by shear force. In particular, a planetary ball mill may be advantageous in vitrification because high impact energy is generated by rotation and revolution of ball mill.

In the step (3), the vitrified mixture is crystallized by heat-treating the same. The heat treatment may be performed at 200-1200° C. for 0.1-100 hours, specifically at 260-360° C. for 1-6 hours, more specifically at 260° C. for 2 hours.

EXAMPLES

The present invention will be described in more detail through examples. The following examples are for illustrative purposes only and the scope of this invention is not limited by the examples.

Example 1

(1) Lithium sulfide ($Li_2S$, purity: 99.9%, Aldrich), phosphorus pentasulfide ($P_2S_5$, purity: 99.9%, Aldrich), elemental phosphorus (P) and elemental sulfur (S) were sufficiently mixed at a molar ratio of 9:2:2:3.

(2) The mixture was put into a planetary ball mill containing zirconia ($ZrO_2$) beads and pulverized at 650 rpm for 8 hours.

(3) The vitrified (or partially vitrified) mixture obtained through the planetary ball milling was heat-treated at 260° C. for 2 hours to obtain a crystallized lithium ion conductive sulfide.

Example 2

A crystallized lithium ion conductive sulfide was prepared in the same manner as in Example 1, except that lithium sulfide ($Li_2S$), phosphorus pentasulfide ($P_2S_5$), elemental phosphorus (P) and elemental sulfur (S) were mixed at a molar ratio of 15:5:2:4.

Example 3

A crystallized lithium ion conductive sulfide was prepared in the same manner as in Example 1, except that lithium sulfide ($Li_2S$), phosphorus pentasulfide ($P_2S_5$), elemental phosphorus (P) and elemental sulfur (S) were mixed at a molar ratio of 6:1:3:3.

Example 4

A crystallized lithium ion conductive sulfide was prepared in the same manner as in Example 1, except that lithium sulfide ($Li_2S$), phosphorus pentasulfide ($P_2S_5$), elemental phosphorus (P) and elemental sulfur (S) were mixed at a molar ratio of 5:2:3:3.

Comparative Example

A crystallized lithium ion conductive sulfide was prepared in the same manner as in Example 1, except that elemental phosphorus (P) and elemental sulfur (S) were not used and lithium sulfide ($Li_2S$) and phosphorus pentasulfide ($P_2S_5$) were mixed at a molar ratio of 7:3.

The molar ratios of the constituents and the chemical formulas of the lithium ion conductive sulfides of Examples 1-4 and Comparative Example are summarized in Table 1.

TABLE 1

| | Molar ratio of constituents | | | | |
|---|---|---|---|---|---|
| | Lithium sulfide | Phosphorus pentasulfide | Elemental Phosphorus | Elemental Sulfur | Chemical formula |
| Comparative Example | 7 | 3 | — | — | $Li_7P_3S_{11}$ |
| Example 1 | 9 | 2 | 2 | 3 | $Li_9P_3S_{11}$ |
| Example 2 | 15 | 5 | 2 | 4 | $Li_{15}P_6S_{22}$ |
| Example 3 | 6 | 1 | 3 | 3 | $Li_{12}P_5S_{14}$ |
| Example 4 | 5 | 2 | 3 | 3 | $Li_{10}P_7S_{18}$ |

<Test Example 1> X-Ray Diffraction Analysis of Lithium Ion Conductive Sulfide

X-ray diffraction analysis was carried out on the lithium ion conductive sulfides of Examples 1-4 and Comparative Example. The result is shown in FIG. 1.

From FIG. 1, it can be seen that the lithium ion conductive sulfides of Examples 1-4 and Comparative Example exhibit peaks at different positions as well as different relative peak ratios. This means that the lithium ion conductive sulfides have different crystal structures.

<Test Example 2> Raman Spectroscopic Analysis of Lithium Ion Conductive Sulfide

Figure 2:
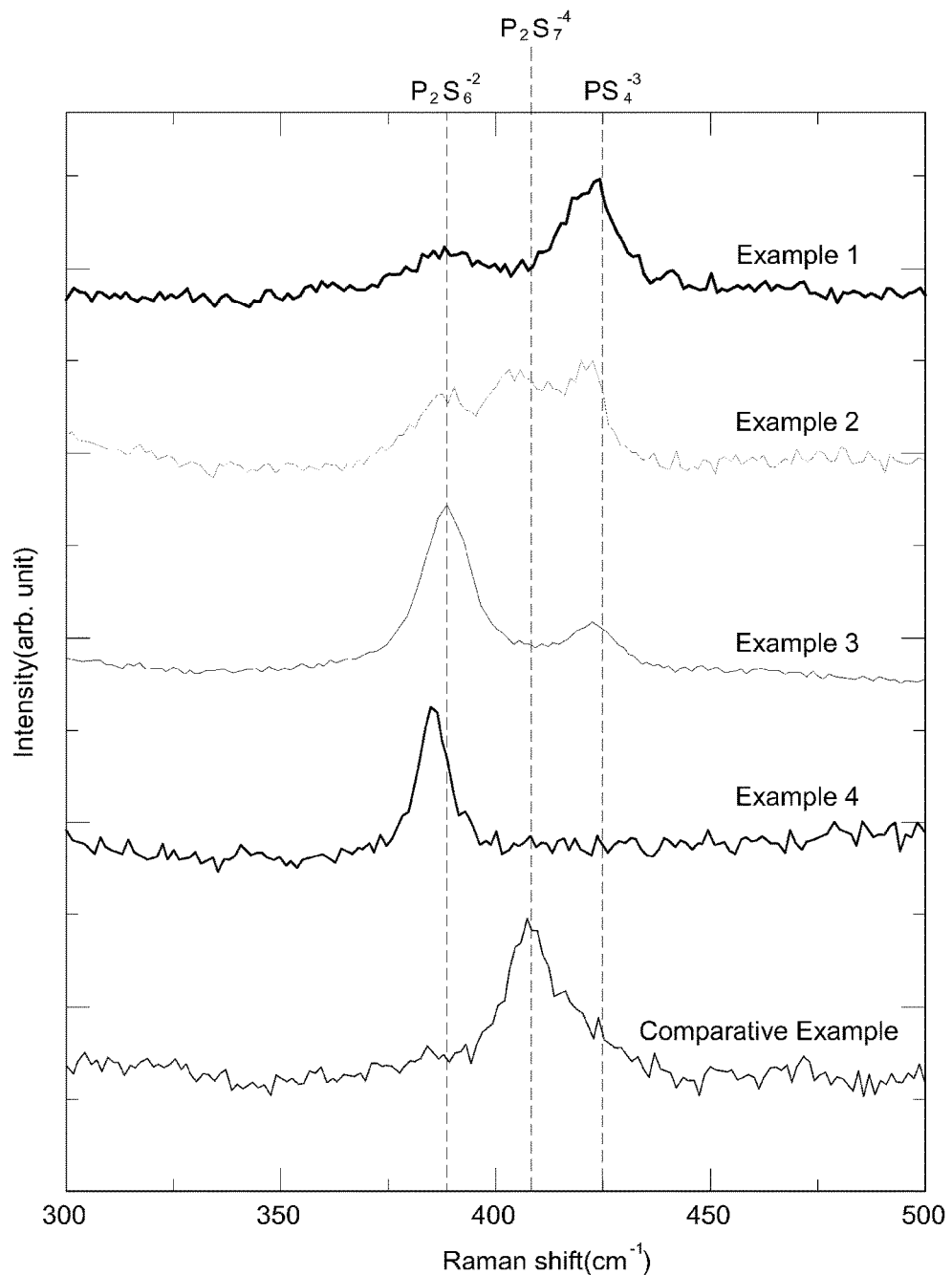
FIG. 2 shows Raman spectroscopic analysis results for Examples 1-4 and Comparative Example in Test Example 2.

Raman spectroscopic analysis results of the lithium ion conductive sulfides of Examples 1-4 and Comparative Example are shown in FIG. 2. The distribution of anion clusters contained in the lithium ion conductive sulfides can be known from FIG. 2.

The existing lithium ion conductive sulfide of Comparative Example shows a main peak ($P_2S_7^{4-}$) at about 410 $cm^{-1}$ and a smaller peak ($PS_4^{3-}$) at about 425 $cm^{-1}$.

Meanwhile, the lithium ion conductive sulfide of Example 1 shows a main peak at about 425 $cm^{-1}$ and a smaller peak at about 390 $cm^{-1}$.

The lithium ion conductive sulfide of Example 2 shows peaks of comparable intensities at about 390, 410 and 425 $cm^{-1}$.

Meanwhile, the lithium ion conductive sulfide of Example 3 shows a main peak at about 390 $cm^{-1}$ and a smaller peak at about 425 $cm^{-1}$, contrary to Example 1.

Example 4 shows a peak only at about 390 $cm^{-1}$.

This means that the lithium ion conductive sulfides of Examples 1-4 and Comparative Example have different anion cluster distributions. In the present invention, because the elemental ratio of the lithium ion conductive sulfide is controlled by mixing the sulfur compound with elemental phosphorus and elemental sulfur, the anion cluster distribution is changed as shown in FIG. 2 and, accordingly, an entirely different crystal structure is obtained as demonstrated in Test Example 1.

<Test Example 3> Elemental Ratio and Ion Conductivity Measurement of Lithium Ion Conductive Sulfide The ratio of constituent elements (Li, P, S) of the lithium ion conductive sulfides of Examples 1-4 and Comparative Example was calculated. Also, the ion conductivity of the lithium ion conductive sulfides was measured. The result is shown in FIG. 3.

Figure 3:
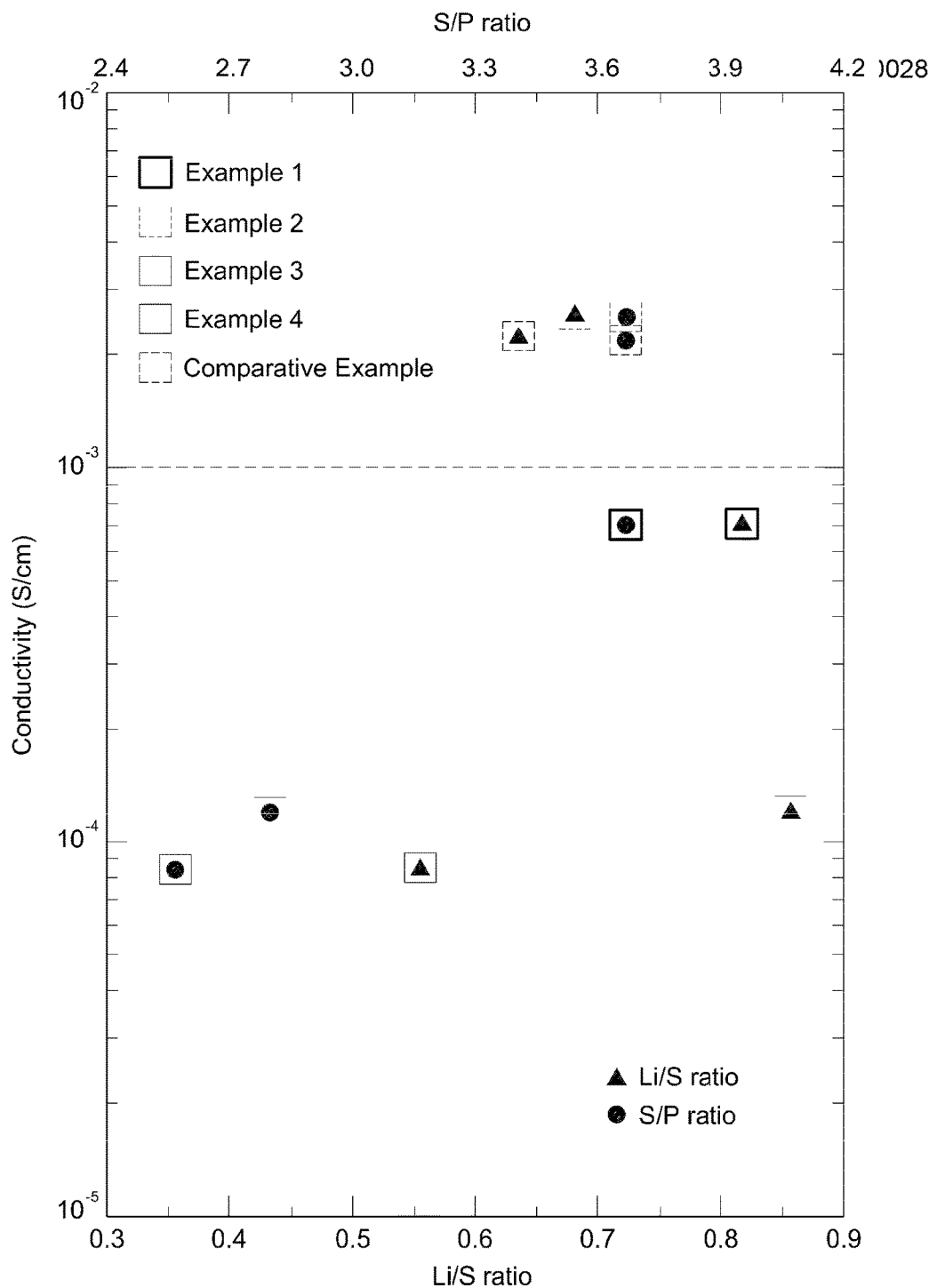
FIG. 3 shows ratios of the elements and ion conductivity measurement results for Examples 1-4 and Comparative Example in Test Example 3.

From the ratio of constituent elements of the lithium ion conductive sulfides of Examples 1-4 shown in FIG. 3, it can be seen that the element ratio of the lithium ion conductive sulfide can be controlled freely by further mixing elemental phosphorus and elemental sulfur to the sulfur compound. In addition, it can be seen that a lithium ion conductive sulfide with a new elemental composition can be designed by introducing such parameters as an S/P ratio (molar ratio of sulfur and phosphorus elements), a Li/S ratio (molar ratio of lithium and sulfur elements).

That is to say, a variety of lithium ion conductive sulfides can be prepared by designing such that the ratios are similar to those of the existing lithium ion conductive sulfide ($Li_7P_3S_{11}$) of Comparative Example ($Li_9P_3S_{11}$ of Example 1, $Li_{15}P_6S_{22}$ of Example 2) or significantly different therefrom ($Li_{12}P_5S_{14}$ of Example 3, $Li_{10}P_7S_{18}$ of Example 4).

From FIG. 3, it can be seen that the lithium ion conductive sulfide of Example 2 has an ion conductivity ($2.5 \times 10^{-3}$ S/cm) which is about 13% higher than that of Comparative Example ($2.2 \times 10^{-3}$ S/cm). Accordingly, a lithium ion conductive sulfide with higher ion conductivity, stability, etc. may be developed based on the present invention.

The present invention has been described in detail referring to the examples and test examples. However, the scope of the present invention is not limited by the examples and test examples and various changes and modifications that can be made based on the basic concepts defined in the appended claims are also included in the scope of the present invention.

What is claimed is:

1. A method for preparing a lithium ion conductive sulfide comprising lithium (Li), phosphorus (P) and sulfur (S), which comprises:
   (1) preparing a mixture comprising lithium sulfide ($Li_2S$) and phosphorus pentasulfide ($P_2S_5$);
   (2) vitrifying the mixture by pulverizing the mixture; and
   (3) crystallizing the vitrified mixture by heat-treating the vitrified mixture,
   wherein the composition ratio of lithium, phosphorus and sulfur in the lithium ion conductive sulfide is controlled independently by performing the vitrification and the crystallization after mixing one or more of elemental phosphorus and elemental sulfur to the mixture in (1),
   wherein, in (1), the molar ratio of the lithium sulfide, the phosphorus pentasulfide, the elemental phosphorus and the elemental sulfur is 9:2:2:3.

2. The method for preparing a lithium ion conductive sulfide according to claim 1, wherein (3) is performed at 200° C.-1200° C. for 0.1 hours-100 hours.

3. The method for preparing a lithium ion conductive sulfide according to claim 1, wherein the lithium ion conductive sulfide exhibits a first peak at 390±5 $cm^{-1}$ and a second peak at 425±5 $cm^{-1}$ in a Raman spectrum and the intensity of the second peak is larger than the intensity of the first peak.

4. The method for preparing a lithium ion conductive sulfide according to claim 1, wherein the lithium ion conductive sulfide has an anion cluster distribution of $P_2S_6^{2-}$ and $PS_4^{3-}$.

5. The method for preparing a lithium ion conductive sulfide comprising lithium (Li), phosphorus (P) and sulfur (S), which comprises:
   (1) preparing a mixture comprising lithium sulfide ($Li_2S$) and phosphorus pentasulfide ($P_2S_5$);
   (2) vitrifying the mixture by pulverizing the mixture; and
   (3) crystallizing the vitrified mixture by heat-treating the vitrified mixture,
   wherein the composition ratio of lithium, phosphorus and sulfur in the lithium ion conductive sulfide is controlled independently by performing the vitrification and the crystallization after mixing one or more of elemental phosphorus and elemental sulfur to the mixture in (1),
   wherein, in (1), the molar ratio of the lithium sulfide, the phosphorus pentasulfide, the elemental phosphorus and the elemental sulfur is 15:5:2:4.

6. The method for preparing a lithium ion conductive sulfide according to claim 5, wherein the lithium ion conductive sulfide exhibits peaks at 390±5 $cm^{-1}$, 410±5 $cm^{-1}$ and 425±5 $cm^{-1}$ in a Raman spectrum.

7. The method for preparing a lithium ion conductive sulfide according to claim 5, wherein the lithium ion conductive sulfide has an anion duster distribution of $P_2S_6^{2-}$, $P_2S_7^{4-}$ and $PS_4^{3-}$.

* * * * *